US009185269B2

United States Patent
Ohba et al.

(10) Patent No.: US 9,185,269 B2
(45) Date of Patent: Nov. 10, 2015

(54) IMAGING DEVICE, INFORMATION PROCESSING DEVICE, INFORMATION PROCESSING METHOD, AND METHOD FOR SYNCHRONIZING FRAME DATA OUTPUT

(75) Inventors: Akio Ohba, Kanagawa (JP); Hiroyuki Segawa, Kanagawa (JP); Hideyuki Saito, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 44 days.

(21) Appl. No.: 14/234,008

(22) PCT Filed: May 31, 2012

(86) PCT No.: PCT/JP2012/003576
§ 371 (c)(1),
(2), (4) Date: Jan. 21, 2014

(87) PCT Pub. No.: WO2013/018262
PCT Pub. Date: Feb. 7, 2013

(65) Prior Publication Data
US 2014/0139740 A1      May 22, 2014

(30) Foreign Application Priority Data
Jul. 29, 2011   (JP) ................. 2011-167800

(51) Int. Cl.
*H04N 5/06*      (2006.01)
*H04N 5/073*    (2006.01)
(52) U.S. Cl.
CPC . *H04N 5/06* (2013.01); *H04N 5/073* (2013.01)
(58) Field of Classification Search
CPC ... H04N 1/047; H04N 1/0473; H04N 1/0476; H04N 1/053; H04N 5/04; H04N 5/06; H04N 5/073; H04N 5/232
See application file for complete search history.

(56) References Cited

U.S. PATENT DOCUMENTS 5,978,041 A * 11/1999 Masuda et al. ............... 348/563
6,107,984 A *  8/2000 Naka et al. ...................... 345/99
(Continued)

FOREIGN PATENT DOCUMENTS

| EP | 0999518 A1 | 5/2000 |
|----|------------|--------|
| JP | 2007067673 A | 3/2007 |

(Continued)

OTHER PUBLICATIONS

International Search report for corresponding application PCT/JP2012/003576, dated Sep. 4, 2012.
(Continued)

*Primary Examiner* — Nicholas Giles
(74) *Attorney, Agent, or Firm* — Matthew B. Dernier, Esq.

(57) ABSTRACT

A shift time monitoring section of a host terminal monitors a shift between the input timing of frame data from an imaging device and the ideal input timing for the frame data, the ideal input timing being obtained from the output frequency of a display. An operation cycle adjusting section transmits a request signal for adjusting the operation cycle per frame in the imaging device according to the magnitude of the shift in the input timing. An H-counter section of the imaging device counts the outputting of the horizontal synchronizing signal with a vertical synchronizing signal in the imaging device as a starting point, and generates a signal at a predetermined scanning line. A VSync adjusting counter section counts a pixel clock with the signal from the H-counter section as a starting point, and generates a vertical synchronization signal at a value set to the pixel clock.

8 Claims, 9 Drawing Sheets

(56) References Cited

U.S. PATENT DOCUMENTS

| | | |
|---|---|---|
| 7,576,803 B2 | 8/2009 | Sun |
| 8,223,265 B2 | 7/2012 | Beppu |
| 2006/0038810 A1* | 2/2006 | Ebata et al. .................. 345/213 |
| 2006/0227244 A1 | 10/2006 | Sun |
| 2007/0177057 A1 | 8/2007 | Beppu |
| 2010/0110291 A1* | 5/2010 | Owashi et al. ................ 348/529 |

FOREIGN PATENT DOCUMENTS

| | | |
|---|---|---|
| JP | 2010136325 A | 6/2010 |
| JP | 2010213119 A | 9/2010 |
| JP | 2011023992 A | 2/2011 |
| TW | I321947 B | 3/2010 |
| TW | I328963 B | 8/2010 |

OTHER PUBLICATIONS

International Preliminary report on Patentability and Written Opinion for corresponding application PCT/JP2012/003576, dated Feb. 13, 2013.

Office Action for corresponding TW application 101126857, dated Apr. 14, 2015.

* cited by examiner

IMAGING DEVICE, INFORMATION PROCESSING DEVICE, INFORMATION PROCESSING METHOD, AND METHOD FOR SYNCHRONIZING FRAME DATA OUTPUT

TECHNICAL FIELD

The present invention relates to an information processing technology using a camera for an input interface.

BACKGROUND ART

A technology that transfers the data of video photographed by a web camera or the like in real time and displays the data on a display has recently been used in a wide range of fields. For example, there are not only video chats and surveillance cameras, which display photographed video as it is, but also a game in which a part of a body such as the head portion of a user or the like is photographed by a video camera, a predetermined region such as eyes, a mouth, a hand, or the like is extracted and replaced with another image, and the result is displayed on a display (Patent Literature 1, for example).

CITATION LIST

Patent Literature

[PTL 1]
European Patent Application Publication No. 0999518

SUMMARY

Technical Problems

In the technology as described above, when the camera and the display are asynchronous to each other, a synchronizing buffer is prepared in a host terminal for relaying between the camera and the display so that output timing is adjusted in frame units. In this mode, a frame remaining as a result of the adjustment needs to be discarded, or a same frame needs to be displayed twice. Such a synchronizing process causes unstable and high latency, so that not only is responsivity from camera input to display degraded but also the synchronizing buffer is essential, putting a squeeze on a storage area, for example. The synchronizing process is difficult particularly in a USB camera whose interface is asynchronous and which cannot share a clock.

The present invention has been made in view of such problems. It is an object of the present invention to provide an image processing technology that can synchronize camera input and display output with each other easily.

Solution to Problems

A mode of the present invention relates to an imaging device. This imaging device includes: an output control section configured to output each piece of frame data of a moving image imaged by an imaging element in order of scanning lines at a frequency of a vertical synchronizing signal; and a vertical synchronizing signal adjusting section configured to change a setting of timing of generation of the vertical synchronizing signal when a shift between an output time of the frame data output by the output control section and a reference output time based on an output frequency in a display displaying the moving image instantly has exceeded a predetermined threshold value.

Another mode of the present invention relates to an information processing device. This information processing device includes: a shift time monitoring section configured to obtain an input time of each piece of frame data sequentially input from an imaging device connected to the information processing device, and monitor a shift between the input time of the frame data and a reference input time based on an output frequency in a display to which the frame data is output; and an operation cycle adjusting section configured to transmit a request signal to adjust timing of generation of a vertical synchronizing signal in the imaging device to the imaging device when the shift has exceeded a predetermined threshold value.

Yet another mode of the present invention relates to an information processing system. This information processing system includes: an imaging device configured to photograph a moving image; and an information processing device configured to sequentially obtain frame data of the moving image and output the frame data to a display. The information processing device includes a shift time monitoring section configured to obtain an input time of each piece of frame data input from the imaging device, and monitor a shift between the input time of the frame data and a reference input time based on an output frequency in the display, and an operation cycle adjusting section configured to transmit a request signal to adjust timing of generation of a vertical synchronizing signal in the imaging device to the imaging device when the shift has exceeded a predetermined threshold value. The imaging device includes a vertical synchronizing signal adjusting section configured to count a number of edges of a pixel clock having a pixel value output frequency as a pixel count value in a last scanning line of a frame, and when obtaining the request signal, change a setting of the pixel count value for generating the vertical synchronizing signal.

Yet another mode of the present invention relates to a frame data output synchronizing method. This frame data output synchronizing method is a method for an imaging device to synchronize a frame data output process in a display displaying a photographed moving image instantly with a frame data output process of the imaging device. The method includes: a step of outputting each piece of frame data in order of scanning lines at a frequency of a vertical synchronizing signal; and a step of changing a setting of timing of generation of the vertical synchronizing signal when a shift between an output time of the output frame data and a reference output time based on an output frequency in the display has exceeded a predetermined threshold value.

It is to be noted that arbitrary combinations of the above-described constituent elements as well as methods, devices, systems, computer programs, recording media on which the computer programs are recorded, and the like into which expressions of the present invention are converted are also effective as modes of the present invention.

Advantageous Effect of Invention

According to the present invention, camera input and display output can be synchronized with each other easily.

BRIEF DESCRIPTION OF DRAWINGS

[FIG. 1]

[FIG. 2]

[FIG. 3]

[FIG. 4]

[FIG. 5]

[FIG. 6]

[FIG. 7]

[FIG. 8]

[FIG. 9]

[FIG. 10]

DESCRIPTION OF EMBODIMENTS

Figure 1:
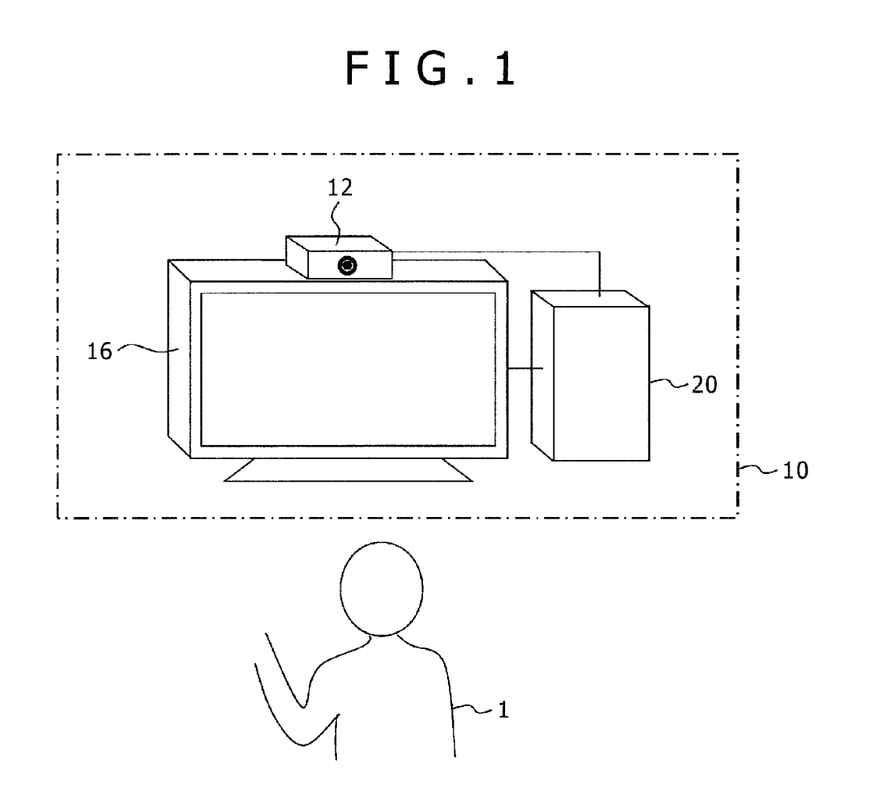
FIG. 1 is a diagram showing an example of configuration of an information processing system to which a present embodiment can be applied.

FIG. 1 shows an example of configuration of an information processing system to which a present embodiment can be applied. The information processing system 10 includes an imaging device 12 for photographing video of a subject such as a user 1 or the like, a host terminal 20 for controlling display of the photographed moving image data, and a display 16 for displaying the moving image. Two or all of the imaging device 12, the host terminal 20, and the display 16 may be combined and provided integrally with each other. In addition, the imaging device 12 does not necessarily need to be installed on the display 16. Further, the user 1 may not be a person, and the number of users 1 is not limited.

The imaging device 12 is a digital video camera including a CCD (Charge Coupled Device) imaging element, a CMOS (Complementary Metal Oxide Semiconductor) imaging element, or another imaging element. The frame data of the moving image photographed by the imaging device 12 is sequentially transmitted to the host terminal 20. The host terminal 20 outputs the transmitted frame data to the display 16 in accordance with the output timing of the display 16. Incidentally, the host terminal 20 may perform predetermined processing other than image output control using the frame data. For example, a game or the like can be realized by converting the figure of the user 1 into a character, generating an image in a virtual world, and displaying the image on the display 16. However, an ordinary technology can be applied as such technology, and therefore no mention thereof will be made here.

The display 16 displays the input frame data as an image under control of the host terminal 20. The display 16 may be a television set having a display for outputting an image and a speaker for outputting audio. The display 16 is for example a liquid crystal television set, a plasma television set, a PC display, or the like.

In the present embodiment, synchronization is achieved at low cost and with ease when camera input by the imaging device 12 and video output by the display 16 are asynchronous to each other in such an information processing system 10. An existing method of a synchronizing process applicable in such a case will first be described to clarify the effect of the present embodiment.

Figure 2:
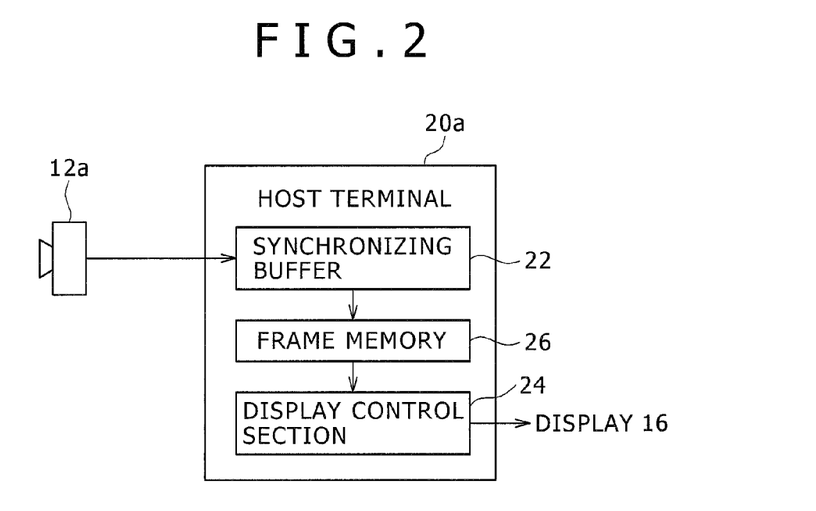
FIG. 2 is a diagram showing a system configuration in conventional technology for realizing a process of synchronizing camera input and video output with each other.

FIG. 2 shows a system configuration in conventional technology for realizing the process of synchronizing camera input and video output with each other. Incidentally, because the same figure shows a configuration in conventional technology, an imaging device 12a and a host terminal 20a are shown so as to be differentiated from the respective devices in the present embodiment. However, a connection form is similar to that shown in FIG. 1. The host terminal 20a needs to output frame data input from the imaging device 12a at the output frequency of the imaging device at the output frequency of the display 16.

For this purpose, the host terminal 20a needs to include, in addition to a frame memory 26 rewritten in accordance with the output frequency of the display 16, a synchronizing buffer 22 for buffering frame data and making timing adjustment between the imaging device 12a and the frame memory 26. The host terminal 20a further includes a display control section 24 for controlling the output of the frame data from the frame memory 26 to the display 16.

Figure 3:
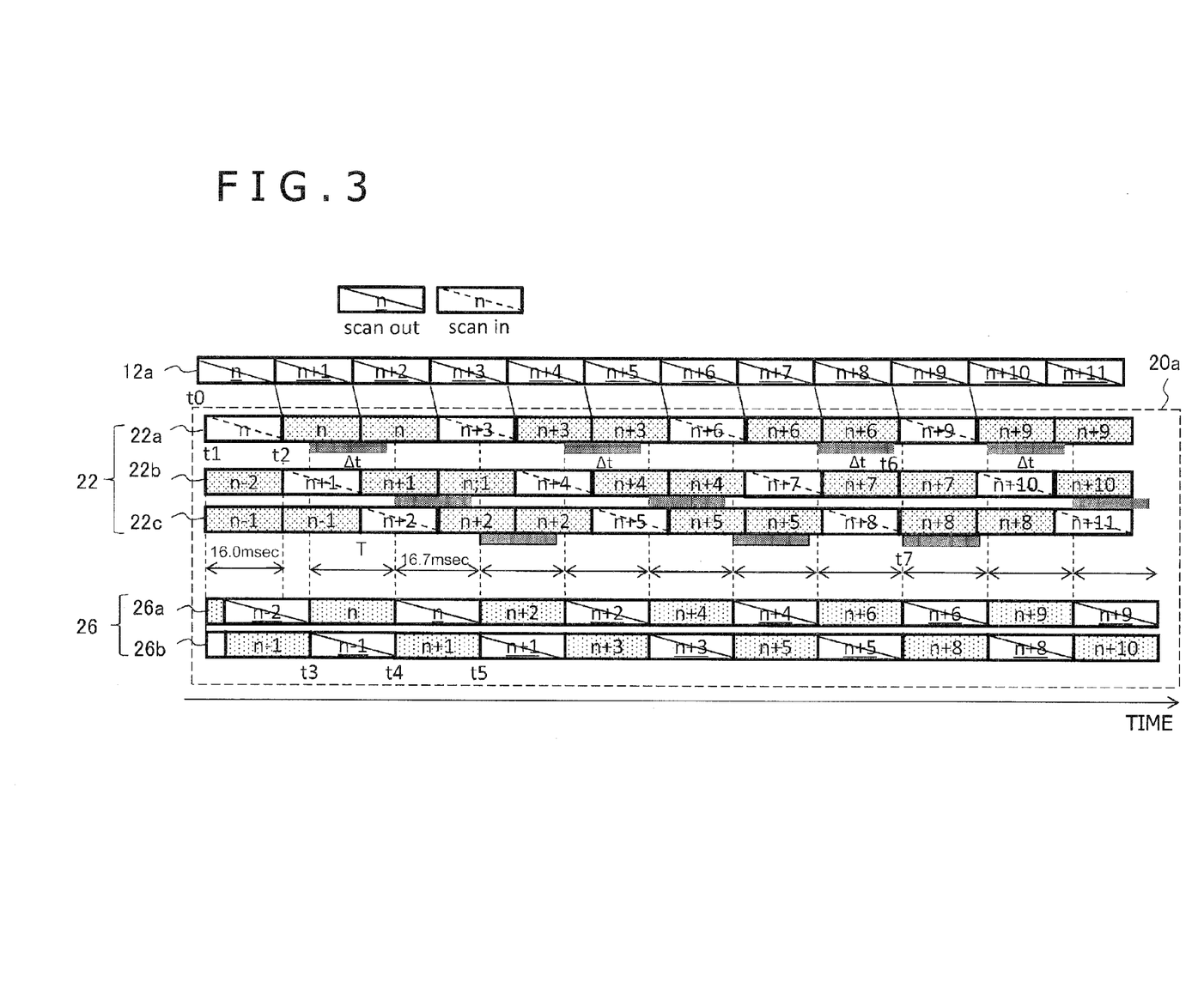
FIG. 3 is a diagram showing changes in output data from an imaging device, data in a synchronizing buffer, and data in a frame memory when the timing of output of frame data is adjusted by the configuration shown in FIG. 2.

FIG. 3 shows changes in output data from the imaging device 12a (top), data in the synchronizing buffer 22 (three rows in the middle), and data in the frame memory 26 (two rows in the bottom) when the timing of output of frame data is adjusted by the configuration shown in FIG. 2. Suppose for example that the imaging device 12a performs photographing and data input at a frame rate of 60 fps and that the display 16 makes moving image display at a frame rate of 59.94 fps. In this case, the cycle of input of frame data from the imaging device 12a to the host terminal 20a is 16.0 msec per frame and the cycle of output from the host terminal 20a to the display 16 is 16.7 msec per frame.

The same figure shows the passage of time on an axis of abscissas, and shows a period corresponding to one frame as one rectangle. Characters within a rectangle denote a frame number. As shown in a legend at the top of the same figure, a solid-line diagonal and a dotted-line diagonal within rectangles respectively represent a period of data output (scan out) by scanning scanning lines and a period of data input (scan in) by scanning scanning lines. In addition, hatched rectangles represent data retention periods.

First, the imaging device 12a starts the imaging and output of an nth frame at time t0. Then, from time t1, a first buffer 22a of the synchronizing buffer 22 in the host terminal 20a stores the data of the nth frame in order of scanning lines in which imaging is ended. A time up to time t2 at which all of the data of the nth frame completes being stored is 16.0 msec, as described above. The display control section 24 starts storing the data of the nth frame in a first region 26a of the frame memory 26 at time t3 at which the data of a previous frame, that is, an (n−1)th frame completes being stored in the frame memory 26.

Incidentally, a marker having a width Δt shown under rectangle rows of the synchronizing buffer 22 denotes a period of readout of frame data represented by rectangles directly above. During a period of readout of the nth frame, that is, a period Δt from time t3, other data cannot be written to the buffer in question. The data of the nth frame written to the first region 26a of the frame memory 26 is output to the display 16 from time t4 at which the display of the previous (n−1)th frame is ended, so that an image is displayed. A time from display start time t4 to end time t5 of the nth frame is 16.7 msec, as described above.

Such a process is similarly performed on each piece of frame data obtained according to the progress of photographing in the imaging device 12a. That is, the imaging device 12a and the synchronizing buffer 22 operate with 16.0 msec as a process cycle per frame, and the frame memory 26 and the display 16 operate with 16.7 msec as a process cycle per frame. As shown in the same figure, the frame memory 26 is divided into a region for storing frame data being output to the display 16 and a region for storing the next frame, and smooth image display is made by using the first region 26a and the second region 26b alternately.

Meanwhile, in the synchronizing buffer 22, timing in which the data of a certain frame completes being stored and timing in which the data of the certain frame is read out are shifted from each other depending on a difference in operating frequency between the imaging device 12a and the display 16. As a result, in most periods, when frame data is stored, the readout of the frame data of the previous frame but one is not completed. For example, the data of the previous nth frame but one is being read out at time T at which the storing of the data of an (n+2)th frame is started.

Therefore, the first buffer 22a storing the data of the nth frame cannot be set as a destination for storing the data of the (n+2)th frame. Thus, in an environment in which the readout of the data of a previous frame but one is not completed at a time of a start of the storing of certain frame data, three buffers, that is, the first buffer 22a, a second buffer 22b, and a third buffer 22c need to be provided as the synchronizing buffer 22, and used cyclically.

When the three buffers are used, a period of retention of data of each frame is basically a length of two cycles excluding the period of a storing process. That is, the period during which the data of a same frame can be retained in the synchronizing buffer 22 is finite depending on the number of buffers. However, when an operation cycle on the side of the display 16 is longer than an operation cycle on the side of the imaging device 12a, with respect to a period of retention of each piece of frame data in the synchronizing buffer 22, a period of readout of each piece of frame data is shifted to a later time gradually. Then, the readout period eventually overruns the data retention period. Thus, there occurs a frame that cannot be displayed on the display 16 even though the data of the frame is stored in the synchronizing buffer 22. In this case, there is no choice but to discard the frame data, and read out and display the next frame data.

In the example of FIG. 3, a period of readout of an (n+7)th frame, which period should come next to time t6 at which an (n+6)th frame completes being read out, overruns a period of retention of the data of the (n+7)th frame. Therefore, the seventh frame is skipped, and the readout of the data of an already stored (n+8)th frame is started at time t7. In the present example, the operation cycle on the side of the display 16 is longer than the basic cycle on the side of the imaging device 12a. The remaining frame data is therefore discarded without being consumed. However, when magnitude relation between the operation cycles is opposite, there occurs a shortage of frame data necessary for display, and there is no choice but to display a same frame for a length of two cycles.

When the imaging device 12a and the display 16 thus operate asynchronously, it is necessary to compare a period of retention of frame data in the synchronizing buffer 22 and a period of readout of the frame data with each other, and make a complex process such as the discarding of data, displaying data twice, or the like occur according to a result of the comparison. In addition, the number of buffer regions necessary as the synchronizing buffer is increased depending on the difference between the operation cycles.

Further, when the host terminal performs image processing in synchronism with the frequency of the display 16, a problem may be caused by the discarding of one frame as an object of processing. When a part of a subject is tracked, for example, and a time interval from a previous frame is increased, a movable range expands, and thus a search region needs to be widened. A time required for the tracking process is therefore increased, which is a factor in increasing latency.

There is also a possibility of a similar shift occurring depending on the accuracy of a built-in oscillating circuit even when the set operating frequencies of the imaging device and the display are the same. Accordingly, the present embodiment adjusts the timing of a vertical synchronizing signal within the imaging device 12 in pixel count units, and thereby contains a cycle shift between data input from the imaging device 12 and data output to the display 16 within a predetermined range and prevents a time difference of at least one frame.

Figure 4:
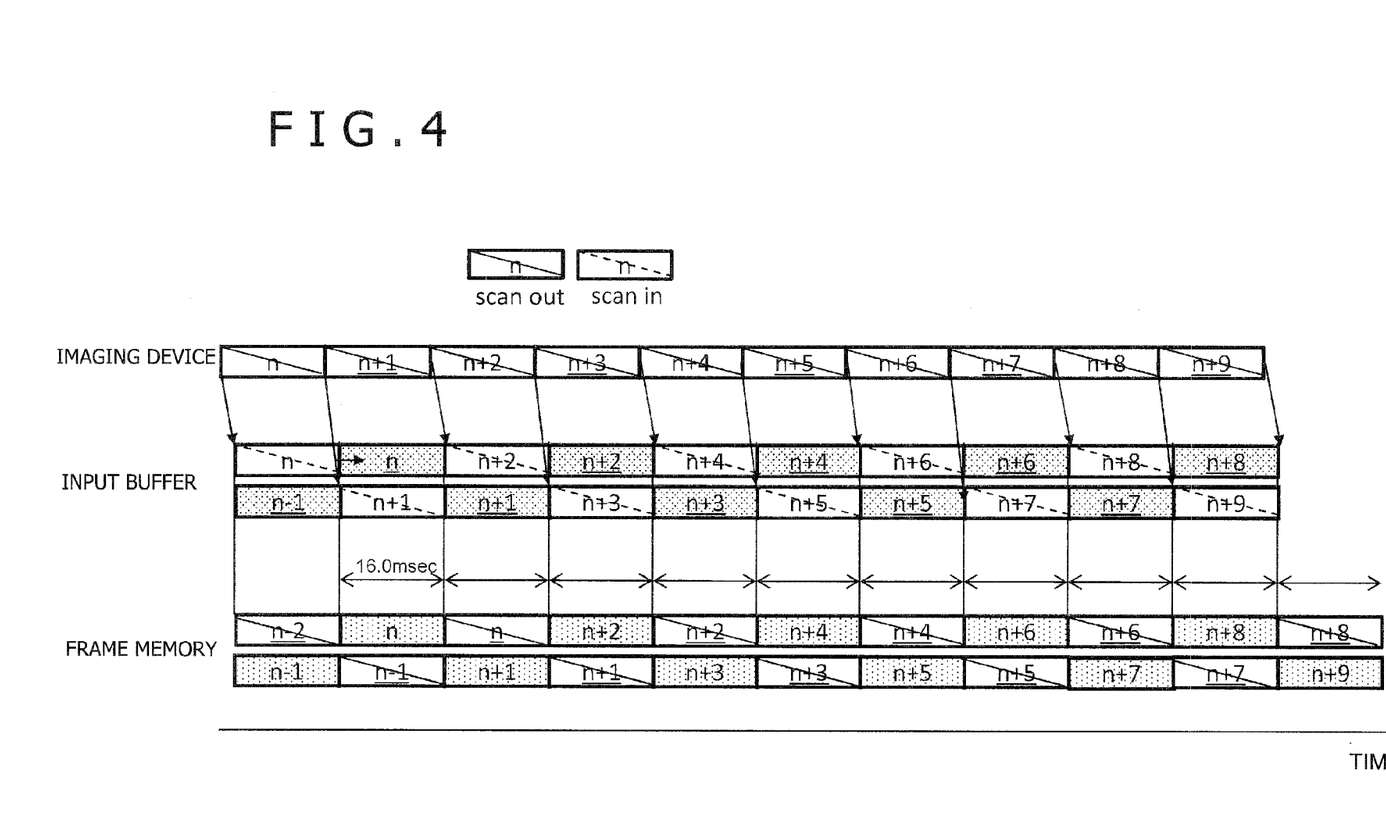
FIG. 4 is a diagram showing changes in output data from the imaging device, data in an input buffer, and data in the frame memory in a case where the imaging device and a display are synchronized with each other.

FIG. 4 shows changes in output data from the imaging device (top), data in an input buffer (two rows in the middle), and data in the frame memory (two rows in the bottom) in a case where the imaging device and the display are synchronized with each other. A manner of representation in the figure is similar to that of FIG. 3. In this case, however, a memory storing input data from the imaging device functions as an "input buffer" to be used for processing within the host terminal 20 rather than a "synchronizing buffer." Suppose that the operation cycles of the imaging device and the display are both 16.0 msec, for example.

In this case, as shown in the same figure, the output of frame data to the frame memory can always be started immediately after the storing of the data in the input buffer is completed, and the two times do not shift from each other. As a result, as with the frame memory, the input buffer can be formed only by a buffer for writing frame data input from the imaging device and a buffer for reading out frame data to the frame memory. In addition, a need for adjustment in frame units due to accumulation of shifts as described above is eliminated. It is thus possible to simplify processing and suppress a sudden increase in latency.

Figure 5:
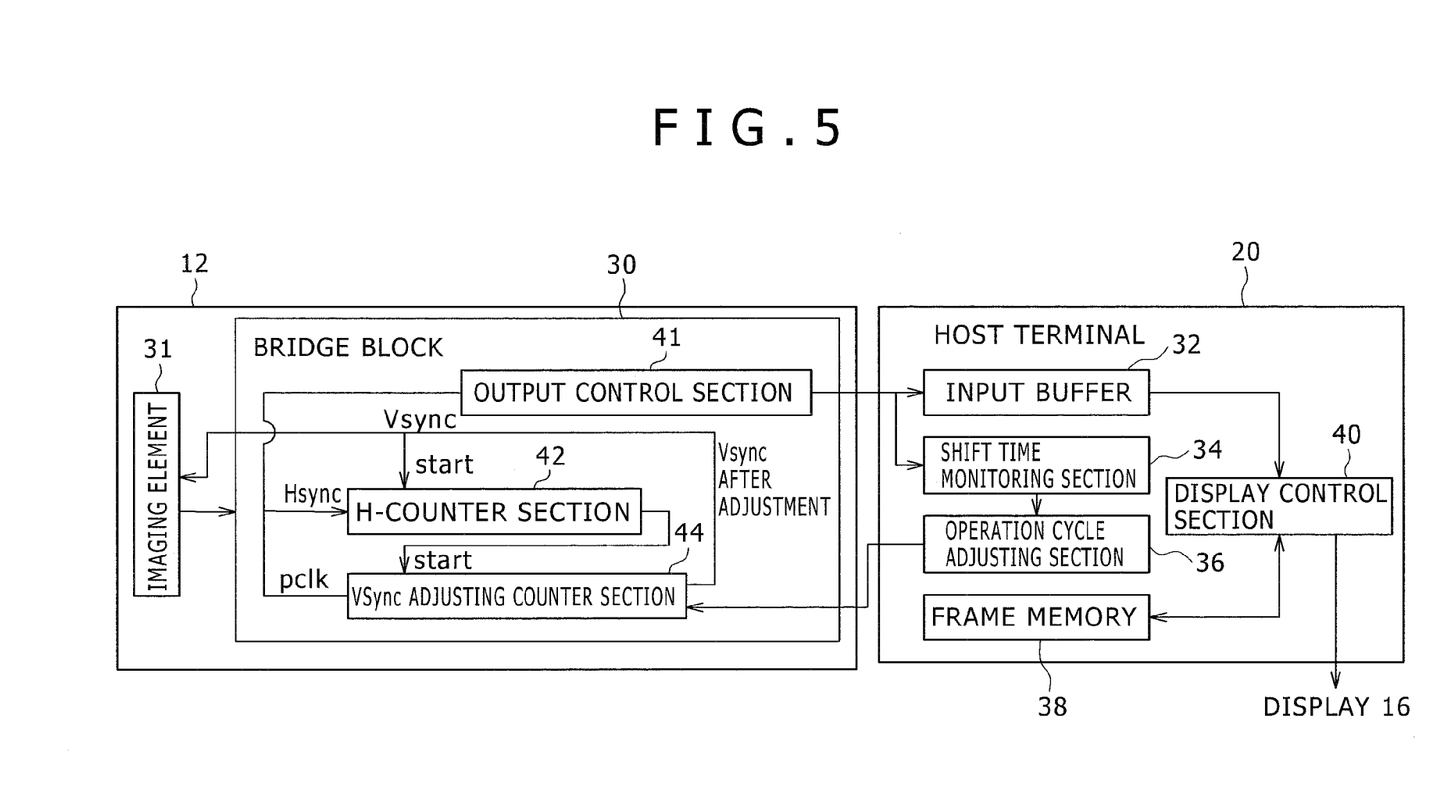
FIG. 5 is a diagram showing a configuration of an imaging device and a host terminal in the present embodiment.

The present embodiment creates conditions close to those of the synchronized operation shown in FIG. 4 even when the operation cycles of the imaging device and the display are different from each other. Specifically, a time defined as a length of one frame, that is, the interval of a vertical synchronizing signal (VSync) in the imaging device 12 is adjusted in pixel count units, and thereby operation cycle adjustment is made with the display cycle of one frame in the display as a target. This mode is effective also for a shift due to the accuracy of an oscillating circuit. FIG. 5 shows a configuration of the imaging device 12 and the host terminal 20 in the present embodiment.

Each functional block shown in FIG. 5 can be implemented by a configuration of a CPU (Central Processing Unit), a RAM (Random Access Memory), a ROM (Read Only Memory), a counter circuit, and the like in terms of hardware, and is implemented by a program exerting various functions such as a data input-output function, a data retaining function, and the like in terms of software. Hence, it is to be understood by those skilled in the art that these functional blocks can be implemented in various forms by only hardware, only software, or a combination thereof, and the functional blocks are not limited to any one of the forms.

The host terminal 20 includes: an input buffer 32 for temporarily storing frame data input from the imaging device 12; a frame memory 38 for temporarily storing frame data to be output to the display 16; and a display control section 40 for controlling the writing of frame data from the input buffer 32 to the frame memory 38 and the output of frame data from the frame memory 26 to the display 16.

The input buffer 32, the frame memory 38, and the display control section 40 have similar functions to those of the synchronizing buffer 22, the frame memory 26, and the display control section 24 in the host terminal 20a shown in FIG. 2. However, as in the description of FIG. 4, the present embodiment does not need to make adjustment using a synchronizing buffer, and thus includes the input buffer 32 in place of the synchronizing buffer 22. As in FIG. 4, it suffices for the input buffer 32 to have two buffer regions.

The host terminal 20 further includes: a shift time monitoring section 34 for monitoring a shift between the input timing of frame data from the imaging device 12 and ideal input timing of the frame data, the ideal input timing being obtained from the output frequency of the display 16; and an operation cycle adjusting section 36 for transmitting a request signal for adjusting the operation cycle per frame in the imaging device 12 according to the magnitude of the shift in the input timing.

The imaging device 12 includes an imaging element 31 and a bridge block 30. The imaging element 31 is a sensor such as a CCD sensor, a CMOS sensor, or another sensor, as described above. The bridge block 30 includes: an output control section 41 for controlling the output of frame data to the host terminal 20; an H-counter section 42 for counting the output of a horizontal synchronizing signal (HSync) with a vertical synchronizing signal in the imaging device 12 as a start point, and generating a signal at a predetermined scanning line; and a VSync adjusting counter section 44 for counting a pixel clock with the signal from the H-counter section 42 as a start point, and generating the vertical synchronizing signal at a value set to the pixel clock.

The output control section 41 sends out the data of a frame obtained as a result of photographing by the imaging element 31 to the host terminal 20 in order of scanning lines via an interface such as a USB or the like. The output control section 41 further separates the information of various kinds of synchronizing signals included in the frame data, and supplies the information to the H-counter section 42 and the VSync adjusting counter section 44 as appropriate. Ordinary technology can be applied as processing performed by the output control section 41, and therefore no mention will be made of details of the processing performed by the output control section 41. Description will be made later of detailed operation of the H-counter section 42 and the VSync adjusting counter section 44 and the shift time monitoring section 34 and the operation cycle adjusting section 36 in the host terminal 20.

Figure 6:
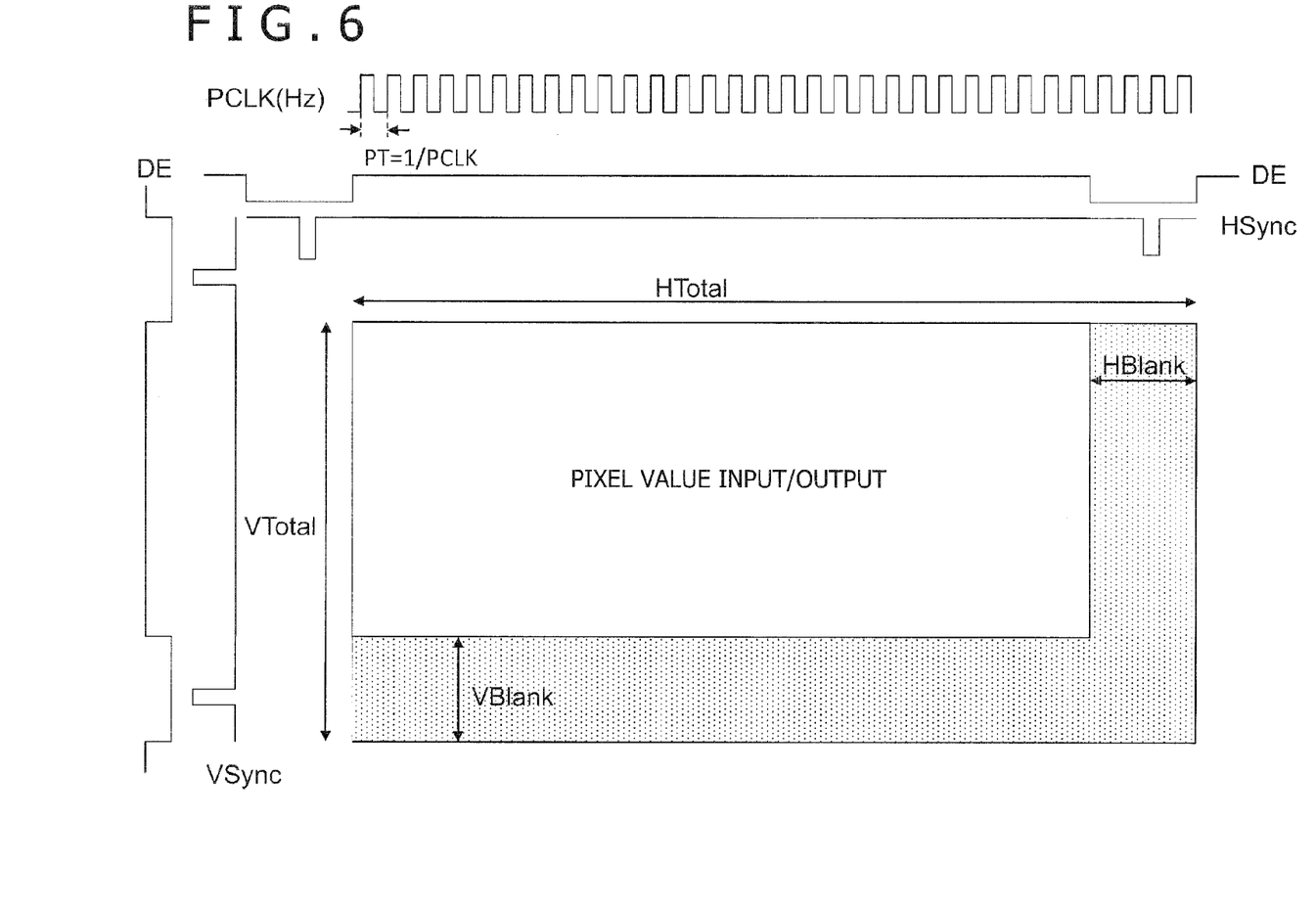
FIG. 6 is a diagram of assistance in explaining signals generated in the imaging device according to the present embodiment.

Description will next be made of principles of synchronizing input from the imaging device 12 and output to the display 16 with each other by the configuration shown in FIG. 5. FIG. 6 is a diagram of assistance in explaining signals generated in the imaging device 12. Incidentally, these signals are generated in an ordinary imaging device, and can be used in the present embodiment. A right direction in the same figure represents the passage of time in pixel units in each scanning line, and a downward direction represents the passage of time in scanning line units. In a rectangle at the center of the same figure, an outline region represents a pixel value input-output period, and a hatched region represents a horizontal blanking period (HBlank) and a vertical blanking period (VBlank).

First, as shown at the top of the figure, the passage of time in each scanning line, which passage of time is represented in the horizontal direction, has a rising edge cycle PT (=1/PCLK) of a pixel clock (PCLK) as one unit. The pixel clock has a pixel value output frequency. In addition, for each scanning line, a data enable signal (DE) indicating a pixel value output period and a horizontal synchronizing signal (HSync) indicating the timing of an end point of the scanning line are generated. The passage of time in scanning line units, which passage of time is represented in the vertical direction of the figure, has the output cycle of the horizontal synchronizing signal as one unit. In addition, for each frame, a data enable signal (DE) indicating a period of output of scanning lines having values and a vertical synchronizing signal (VSync) indicating the timing of an end point of the frame are generated.

Here, letting HTotal be a count value of the pixel clock up to a next scanning line including the horizontal blanking period, and letting VTotal be a count value of scanning lines up to a next frame including the vertical blanking period, the frame rate R (fps) of a frame photographed by the imaging device 12 and input to the host terminal 20 is $R(\text{fps}) = PCLK(\text{Hz})/(H\text{Total} \times V\text{Total})$ That is, a cycle Tint (sec) of input per frame is $T\text{int}(\text{sec}) = 1/R(\text{fps}) = (H\text{Total} \times V\text{Total})/PCLK(\text{Hz}) = H\text{Total} \times V\text{Total} \times PT(\text{sec})$ The present embodiment creates conditions close to those of synchronized operation by adjusting the cycle Tint of input per frame of the frame data input from the imaging device 12 to the cycle of output per frame in the display 16. Accordingly, the present embodiment first makes rough adjustment in units of the number of scanning lines by adjusting HTotal and VTotal, and thereafter monitors an actual time shift and makes fine adjustment in pixel count units in the input period of a last scanning line of the frame, which last scanning line is determined as a result of adjusting HTotal and VTotal.

Supposing that an output frame rate in the display 16 is a target frame rate TA, the adjustment in units of the number of scanning lines is made by determining HTotal and VTotal so as to satisfy the following expression.

$PCLK/(H\text{Total} \times V\text{Total}) < 1TA < PCLK/H\text{Total} \times (V\text{Total}-1)$ The following expression is obtained when the reciprocal of each term in the above expression is obtained and comparison is made in terms of cycles.

$PT \times H\text{Total} \times (V\text{Total}'1) < 1/TA < PT \times H\text{Total} \times V\text{Total}$ That is, HTotal and VTotal are adjusted so that the cycle of output per frame in the display 16 falls between the time "PT×HTotal×(VTotal−1)" in pixel clock units which time is taken from a start point of a frame immediately after the vertical synchronizing signal to the completion of scanning of a last scanning line but one and the time "PT×HTotal×VTotal" which time is taken from the start point to the completion of scanning of a last scanning line. Thereby the fine adjustment in pixel count units can be limited to within the scanning time of the last scanning line.

Figure 7:
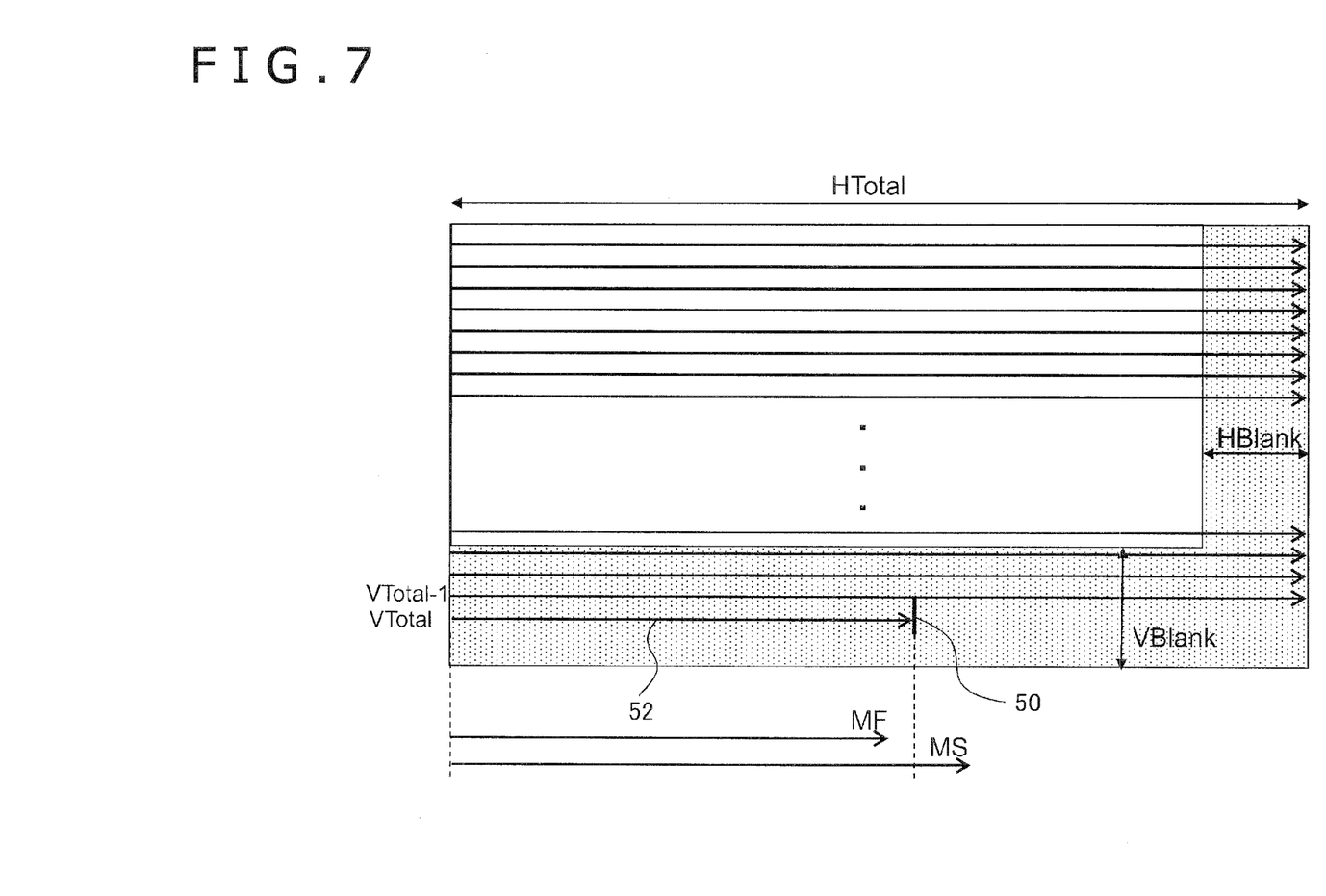
FIG. 7 is a diagram of assistance in explaining principles of adjusting the timing of generation of a vertical synchronizing signal in the imaging device according to the present embodiment.

FIG. 7 is a diagram of assistance in explaining principles of adjusting the timing of generation of the vertical synchronizing signal in the imaging device 12. A rectangle in the same figure represents the input period of one frame including the horizontal synchronizing signal and the vertical synchronizing signal, as in FIG. 6. In addition, arrows traversing the rectangle from a left to a right schematically represent scanning lines. Here, supposing that a time at which the display of one frame is ended in the display 16 corresponds to a line 50, the line 50 is located on the last scanning line determined by the above expression or, to be exact, in a time between a count of VTotal−1 and a count of VTotal.

The adjustment of HTotal and VTotal is made in scanning line units, and is therefore determined in advance according to the output frequency of the display 16. For example, the determination may be made after a table associating the output frequency of the display with appropriate values of HTotal and VTotal is prepared in an internal memory of the imaging device 12 or the host terminal 20 and the table is referred to according to the actual output frequency when the display 16 is connected. In some cases, the pixel clock itself may be set as an object of the adjustment based on the above expression.

After HTotal and VTotal are thus determined, the fine adjustment in pixel count units is then made while an actual time shift is monitored. This adjustment is qualitatively an adjustment that brings an end point of the frame in question which end point should be on the last scanning line, that is, the head of a last arrow 52 in FIG. 7 close to the line 50. When the vertical synchronizing signal is generated and the imaging of a next frame is started at the end point obtained by the adjustment, the cycle of input per frame from the imaging device 12 and the cycle of output per frame to the display 16 are approximately equal to each other.

In consideration of a rounding error caused in time measurement in pixel count units as compared with a precise measured time, fluctuations in each of the frequencies of the imaging device and the display, a processing load, and the like, an efficient method is to adjust the length of the arrow 52, that is, a pixel count value up to the generation of the vertical synchronizing signal in the last scanning line at a point in time that a predetermined amount of time shifts is accumulated. Such a pixel count value will hereinafter be referred to as a "last line period."

An actual adjustment process is performed by determining, in advance, a last line period MF shorter than a distance to the line 50 on the last scanning line and a last line period MS longer than the distance to the line 50 on the last scanning line, and selecting these last line periods. The shorter last line period MF and the longer last line period MS are values satisfying the following expression.

$$PT \times (HTotal \times (VTotal-1)+MF) < 1/TA < PT \times (HTotal \times (VTotal-1)+MS)$$

Then, the cycle of input per frame from the imaging device 12 is adjusted by setting the longer last line period MS when the input from the imaging device 12 is faster than the output to the display 16 and the shorter last line period MF when the input from the imaging device 12 is slower than the output to the display 16.

Supposing that the two last line periods MF and MS are immediate integral values sandwiching the time of an end of output of one frame by the display 16, which time is indicated by the line 50, MF and MS can be determined from the following expression.

$$MF = \mathrm{floor}(FIT/PT - HTotal(VTotal-1))$$

$$MS = \mathrm{ceil}(FIT/PT - HTotal(VTotal-1))$$

where floor(x) is a function that outputs a maximum integer equal to or less than x, and ceil(x) is a function that outputs a minimum integer equal to or more than x. In addition, FIT is the display cycle of one frame of the display 16, which display cycle is given by 1/TA.

Further, in consideration of the width of fluctuations in operating frequency in the imaging device 12 and the display 16, a difference between the two last line periods MF and MS may be increased by determining the two last line periods MF and MS as follows.

$$MF = \mathrm{floor}(FIT/PT - HTotal(VTotal-1)) - dz/2$$

$$MS = \mathrm{ceil}(FIT/PT - HTotal(VTotal-1)) + dz/2$$

where dz is a correction value obtained by taking the width of the fluctuations into consideration, and is determined in advance.

Figure 8:
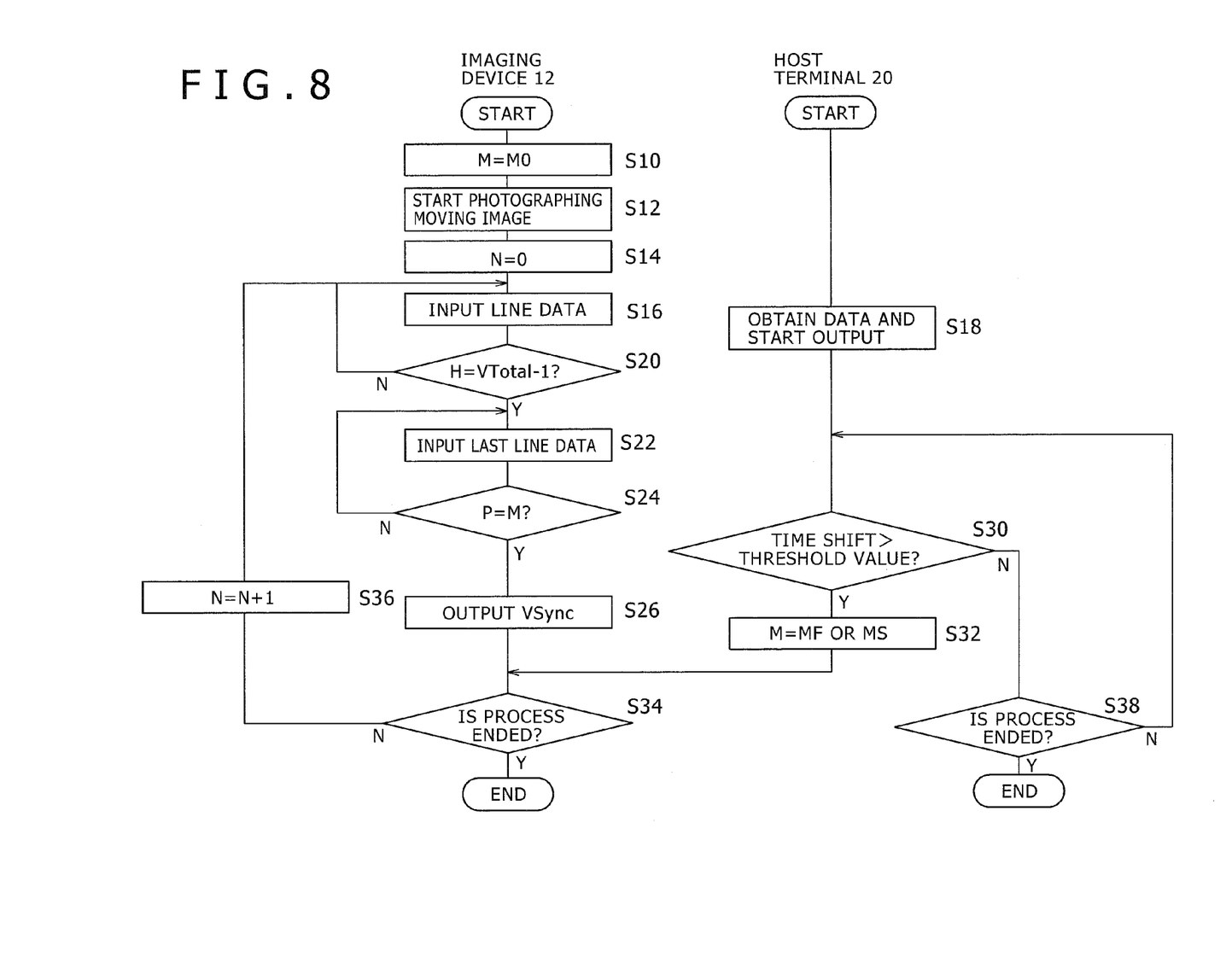
FIG. 8 is a flowchart of the procedure of a process of adjusting a cycle of input per frame from the imaging device in the present embodiment.

A process procedure when adjustment as described above is realized by the configuration shown in FIG. 5 will next be shown. FIG. 8 is a flowchart of the procedure of a process of adjusting the cycle of input per frame from the imaging device 12 in the present embodiment. The process in the same flowchart is started when a user instructs the host terminal 20 to perform functions including the photographing of a moving image and image display using the moving image and the host terminal 20 requests the imaging device 12 to start photographing.

First, in the imaging device 12, an initial value M0 is set as a last line period M (S10). The initial value M0 may be any value from zero to HTotal, or may be MF or MS. Next, the imaging device 12 starts photographing a moving image (S12). Then, the output control section 41 assigns zero to a frame number N (N14), and inputs the data of a zeroth frame to the host terminal 20 in order of scanning lines (S16). At this time, the H-counter section 42 sets a count value to zero in response to the generation of the vertical synchronizing signal, and thereafter monitors the number H of already input scanning lines by counting the output of the horizontal synchronizing signal.

The host terminal 20 obtains the data input from the imaging device 12, and starts outputting the data to the display 16, whereby a moving image is displayed on the display 16 (S18). The imaging device 12 continues outputting the data of each scanning line while the number H of scanning lines already input to the host terminal 20 does not reach VTotal−1 (N in S20, and S16). When the number H of already output scanning lines has reached VTotal−1 (Y in S20), the data of the last scanning line VTotal is input to the host terminal 20. At this time, the VSync adjusting counter section 44 sets a count value to zero in response to a signal from the H-counter section 42 which signal indicates that the number H of scanning lines has reached VTotal−1, and thereafter counts rising edges of the pixel clock.

The data input is continued while a pixel count value P has not reached the last line period M (N in S24, and S22). When the pixel count value P has reached the last line period M (Y in S24), the VSync adjusting counter section 44 outputs the vertical synchronizing signal to the imaging element 31 and the H-counter section 42 (S26).

Each time the data of one frame is input from the imaging device 12, the shift time monitoring section 34 of the host terminal 20 obtains a time stamp at the time of reception. Then, whether or not a difference between an actual time from a start of input of the data of the zeroth frame to the completion of input of the data of an Nth frame and an assumed time when the input operation is performed at the output frequency of the display 16, that is, a shift, has exceeded a threshold value prepared in advance is determined (S30). When the threshold value is exceeded (Y in S30), a value of MF or MS is set again as the last line period M retained by the VSync adjusting counter section 44 of the imaging device 12 (S32).

A shift amount D is obtained by the following expression, for example.

$$D=|\text{time\_stump}(N)-\text{FIT}\times N|$$

where time_stump(N) is a time stamp difference from the start of input of the data of the zeroth frame to the completion of input of the data of the Nth frame. This time stamp is measured on the basis of a frequency controlling voltage VCT derived from a video clock output by the host terminal 20. Thereby an accurate comparison can be made on the basis of an actual time of FIT controlled within the host terminal 20.

As described above, when the shift amount D is larger than a threshold value dw, the last line period M is set again. At this time, when time_stump (N)−FIT×N is a positive value, the input from the imaging device 12 is slow, and thus the shorter last line period MF is set. When time_stump (N)−FIT×N is a negative value, the input from the imaging device 12 is fast, and thus the longer last line period MF is set. In actuality, the last line period may be updated in the imaging device 12 during the period of process steps of S16 and S20 in which data other than the last scanning line is input to the host terminal 20. When the shift amount D has not exceeded the threshold value dw, the setting is maintained as it is (N in S30).

During a time during which the process does not need to be ended on the basis of an instruction input from the user or the like (N in S34, and N in S38), the above process is repeated while the frame number is incremented in the imaging device 12 (S36). Suppose that in the meantime, the photographing in the imaging device 12, the input of frame data to the host terminal 20, the output of frame data to the display 16, and the display of the moving image on the display 16 continue being performed. When a need to end the process arises, the process is ended in both of the imaging device 12 and the host terminal 20 (Y in S34, and Y in S38).

Figure 9:
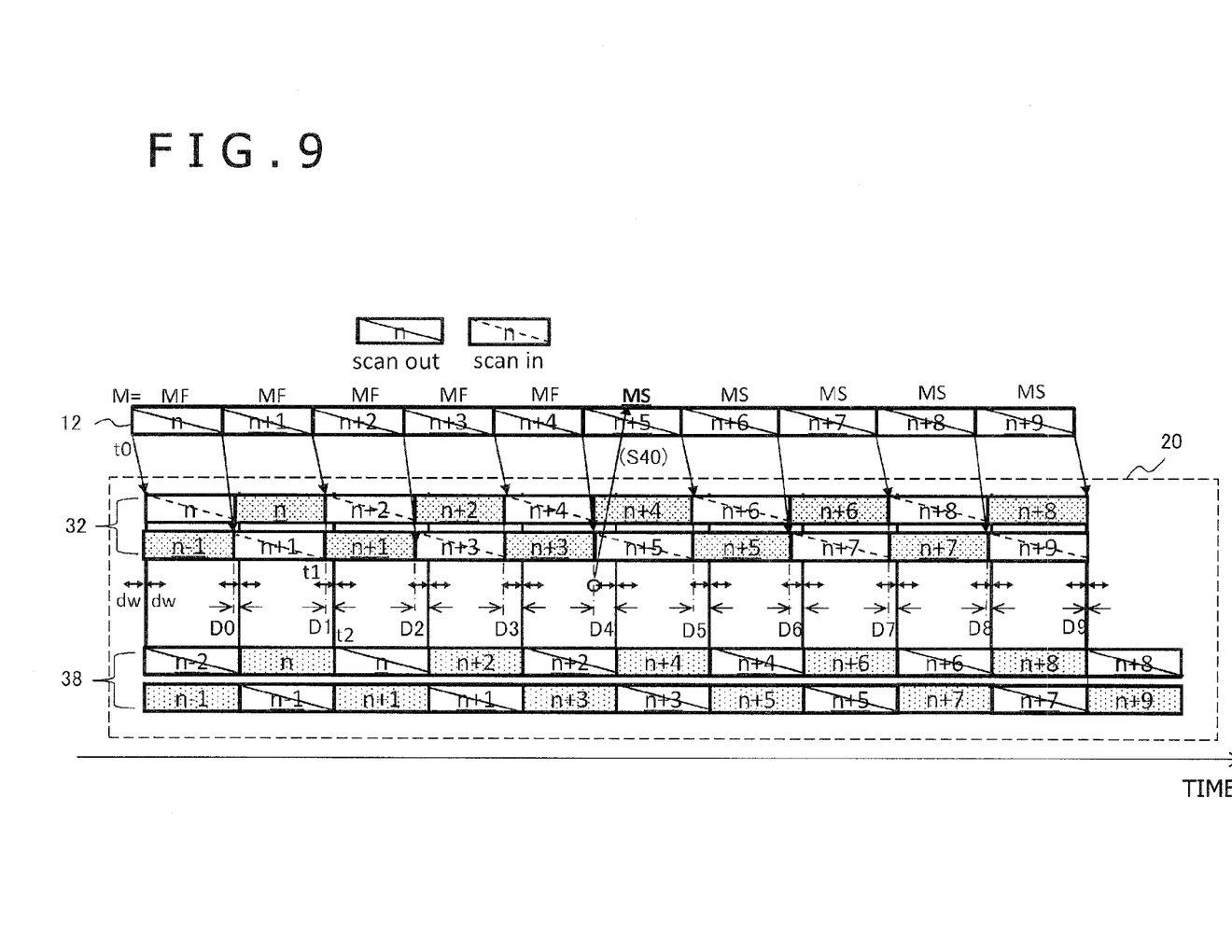
FIG. 9 is a diagram showing changes in output data from the imaging device, data in the input buffer, and data in the frame memory in a case where the present embodiment adjusts the cycle of input from the imaging device.

FIG. 9 shows changes in output data from the imaging device 12 (top), data in the input buffer 32 (two rows in the middle), and data in the frame memory 38 (two rows in the bottom) in a case where the present embodiment adjusts the cycle of input from the imaging device 12. A manner of representation in the figure is similar to that of FIG. 4. In addition, the same figure shows, on each rectangle representing a frame as an object of output in the imaging device 12, a set value set as the last line period M to the corresponding frame.

First, at time t0 at which an nth frame is output from the imaging device 12, the shorter last line period MF is set as the last line period M. Because of this setting, the cycle of input of data per frame from the imaging device 12 is slightly shorter than the cycle of output of data per frame to the display 16.

As described with reference to FIG. 4, when the input from the imaging device 12 and the output to the display 16 are perfectly synchronized with each other, frame data that completes being stored in the input buffer 32 is output to the display 16 immediately after the frame data completes being stored in the input buffer 32. Also in the present embodiment, a state close to that of FIG. 4 is obtained because VTotal and HTotal are adjusted as described above and then adjustment to the output frequency of the display is made in pixel count units.

Meanwhile, as the frame process progresses, subtle shifts between the cycle of input from the imaging device 12 and the cycle of output to the display 6 are accumulated. In the same figure, shift times between times at which the data of respective frames completes being stored in the input buffer 32 and times at which the data starts to be read out to the frame memory 38 are denoted as D0, D1, D2, . . . For example, a time shift from time t1 at which the data of an (n+1)th frame completes being stored in the input buffer 32 to time t2 of a start of readout of the data is D1.

This time shift results from a difference between the cycle of input per frame from the imaging device 12 and the cycle of output per frame to the display 16, and in turn corresponds to a value used in threshold value determination by the shift time monitoring section 34. As described above, when the smaller value MF is set as the last line period M, the cycle of input from the imaging device 12 is shorter than the cycle of output to the display 16. Thus, the time of completion of input of data is shifted to an earlier time than the time of a start of readout of the data, and the value is increased from D0 to D1 to D2 to D3. Then, D4 exceeds the threshold value dw.

Receiving this result, the operation cycle adjusting section 36 transmits a request signal to set again the last line period M retained by the VSync adjusting counter section 44 to the longer last line period MS (S40). This setting makes the cycle of input from the imaging device 12 longer than the cycle of output to the display 16. Thus, the shift time turns to decrease with subsequent D5, and decreases from D6 to D7 to D8 to D9. As the frame process progresses further, the shift time eventually increases in a direction in which the input from the imaging device 12 is delayed. The last line period M is therefore set to the shorter last line period MF again at a point in time that the threshold value dw is exceeded (not shown).

This reduces a difference between the time at which frame data from the imaging device 12 has completed being stored and the time at which output of frame data to the display 16 is started to a maximum of about the threshold value dw. Thus, an excess or a shortage of data for one frame does not occur. As a result, discarding data or displaying a same frame twice for consistency is not needed, and an occurrence of unstable latency can be suppressed. Further, only two buffer regions suffice for the input buffer 32, as shown in FIG. 9.

Figure 10:
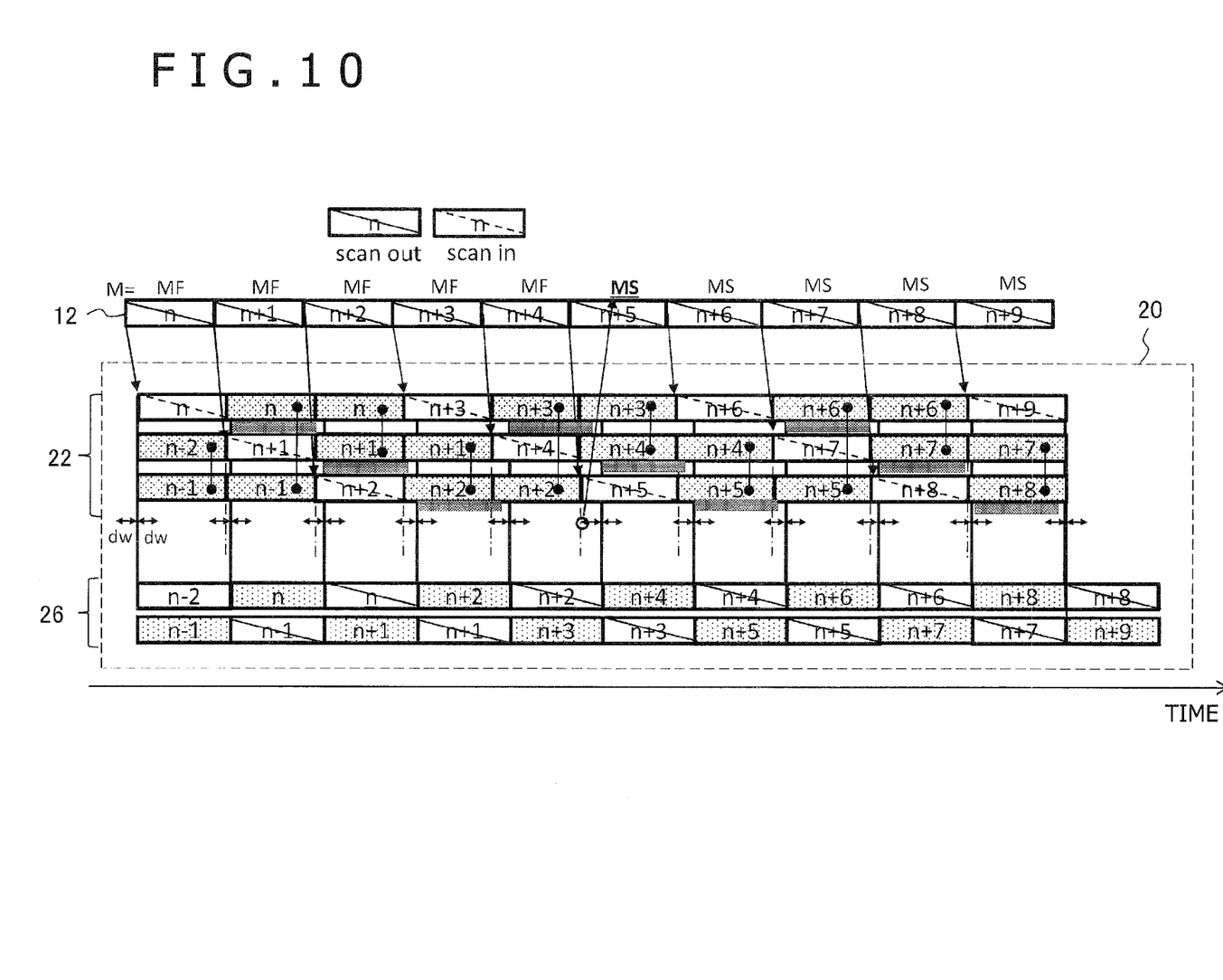
FIG. 10 is a diagram showing changes in output data from the imaging device, data in the synchronizing buffer, and data in the frame memory in a case where the imaging device according to the present embodiment is connected in a state in which the synchronizing buffer is provided to the host terminal.

The imaging device 12 according to the present embodiment operates in a similar manner to an existing asynchronous imaging device when the setting of the last line period M is not updated. Hence, synchronism/asynchronism may be selected according to a use. FIG. 10 shows changes in output data from the imaging device 12 (top), data in the synchronizing buffer 22 (three rows in the middle), and data in the frame memory 26 (two rows in the bottom) in a case where the imaging device 12 according to the present embodiment is connected in a state in which the synchronizing buffer 22 is provided to the host terminal 20, as shown in FIG. 2.

As shown in FIG. 3, in the case of operation with only the synchronizing buffer 22, when the operation cycle on the side of the display 16 is longer than that on the side of the imaging device 12, with respect to a period of retention of the data of each frame in the synchronizing buffer 22, a period of readout of the data is shifted to a later time gradually. Conversely, when the operation cycle on the side of the display 16 is shorter than that on the side of the imaging device 12, the period of readout of the data is shifted to an earlier time gradually. By introducing the present embodiment and setting the last line period M appropriately, the data of each frame can be read out in about a first-half period of the data retention period in the synchronizing buffer 22, as shown in the same figure.

As a result, even when data readout is performed according to the frequency of the display 16, data can be accessed surely in original order of frames, and no additional process is required. In addition, because a situation in which the data of a frame that cannot be displayed is discarded does not occur, time intervals between frames are held constant. This prevents variations in processing load and accuracy due to the discarding of a frame from occurring even when a process such as tracking or the like is performed using read-out frame data.

According to the present embodiment described above, in the system that displays a moving image photographed by the imaging device on the display in real time, the timing of generation of the vertical synchronizing signal is adjusted so as to approximate the cycle of input of frame data from the imaging device to the host terminal to the cycle of output from the host terminal to the display. For this, adjustment in length and number of scanning lines is first made in advance, and the timing of generation of the vertical synchronizing signal in the last scanning line is adjusted in pixel count units while an actual time shift is monitored.

Thereby time adjustment on a level of rising edge cycles of the pixel clock, that is, in about one millionth of the cycle of output of the display can be realized at low cost. In a case where only the number of lines is adjusted, some frames may vary in photographing time relatively greatly, and variations in exposure may be caused in an imaging element having a rolling shutter. However, adjustment in minute time as in the present embodiment has an effect on exposure at a negligible level.

In addition, the adjustment only updates a set value again at a point in time that a predetermined amount of time shifts is accumulated, and thus has little effect on processing cost. Further, the threshold value for the difference between the two last line periods or time shifts enables the adjustment to be made in timing that accommodates fluctuations in operating frequency of the device itself. Therefore, an inconvenience of making unnecessary adjustment with a high frequency and thus imposing an additional processing load is not caused. As a result, operation from the photographing of a moving image to display can be performed with low latency and good responsivity at low cost and with little effect on a processing load.

The present invention has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present invention.

For example, the imaging device in the present embodiment includes a single-lens imaging element, but may be configured to include a plurality of cameras such as a stereo camera or the like. In this case, video from the plurality of cameras can be synchronized with the output of a display easily by supplying the vertical synchronizing signal generated from the VSync adjusting counter section to all of the cameras.

REFERENCE SIGNS LIST

10 Information processing system, 12 Imaging device, 16 Display, 20 Host terminal, 30 Bridge block, 32 Input buffer, 34 Shift time monitoring section, 36 Operation cycle adjusting section, 38 Frame memory, 40 Display control section, 41 Output control section, 42 H-counter section, 44 VSync adjusting counter section.

INDUSTRIAL APPLICABILITY

As described above, the present invention is applicable to information processing devices such as computers, game devices, cameras, image display devices, and the like and information processing systems.

The invention claimed is:

1. An imaging device comprising:
    at least one microprocessor, at least one computer readable recording medium, and at least one executable computer program stored in the recording medium, where the at least one microprocessor executes the at least one computer program to implement the following:
    an output control section configured to output each piece of frame data of a moving image imaged by an imaging element in order of scanning lines at a frequency of a vertical synchronizing signal; and
    a vertical synchronizing signal adjusting section configured to change a setting of timing of generation of the vertical synchronizing signal when a shift between an output time of the frame data output by the output control section and a reference output time based on an output frequency in a display displaying the moving image instantly has exceeded a predetermined threshold value,
    wherein the vertical synchronizing signal adjusting section counts a number of edges of a pixel clock having a pixel value output frequency as a pixel count value in a last scanning line of a frame, and changes a setting of the pixel count value for generating the vertical synchronizing signal.

2. The imaging device according to claim 1, wherein a pixel count value indicating a scanning cycle of each scanning line of the frame and a number of scanning lines of the frame are set such that a reference end time of a scanning period per frame based on the output frequency in the display arrives during a scanning period of the last scanning line of the frame in the imaging device.

3. The imaging device according to claim 2, further comprising
    a memory for retaining a table associating the output frequency in the display with the pixel count value indicating the scanning cycle of the scanning line and the number of scanning lines of the frame, the pixel count value indicating the scanning cycle of the scanning line and the number of scanning lines of the frame being to be set for the output frequency in the display,
    wherein the pixel count value and the number of scanning lines are set by referring to the table according to the output frequency of the display actually connected.

4. The imaging device according to claim 1, wherein the vertical synchronizing signal adjusting section selects and sets, as a pixel count value for generating the vertical synchronizing signal, a pixel count value of timing slower than a reference end time of a scanning period per frame based on the output frequency in the display and a pixel count value of timing faster than the reference end time, the pixel count values being determined in advance, according to relation between the output time of the frame data and the reference output time as to whether the output time of the frame data is before or after the reference output time.

5. An information processing device comprising:
    at least one microprocessor, at least one computer readable recording medium, and at least one executable computer program stored in the recording medium, where the at least one microprocessor executes the at least one computer program to implement the following:
    a shift time monitoring section configured to obtain an input time of each piece of frame data sequentially input from an imaging device connected to the information processing device, and monitor a shift between the input time of the frame data and a reference input time based on an output frequency in a display to which the frame data is output; and an operation cycle adjusting section configured to transmit a request signal to adjust timing of generation of a vertical synchronizing signal in the imaging device to the imaging device when the shift has exceeded a predetermined threshold value, wherein the timing of the generation of the vertical synchronizing signal is adjusted by counting a number of edges of a pixel clock having a pixel value output frequency as a pixel count value in a last scanning line of a frame, and changing a setting of the pixel count value for generating the vertical synchronizing signal.

6. An information processing system comprising:

at least one microprocessor, at least one computer readable recording medium, and at least one executable computer program stored in the recording medium, where the at least one microprocessor executes the at least one computer program to implement the following:

an imaging device configured to photograph a moving image; and an information processing device configured to sequentially obtain frame data of the moving image and output the frame data to a display;

the information processing device including a shift time monitoring section configured to obtain an input time of each piece of frame data input from the imaging device, and monitor a shift between the input time of the frame data and a reference input time based on an output frequency in the display, and an operation cycle adjusting section configured to transmit a request signal to adjust timing of generation of a vertical synchronizing signal in the imaging device to the imaging device when the shift has exceeded a predetermined threshold value;

the imaging device including a vertical synchronizing signal adjusting section configured to count a number of edges of a pixel clock having a pixel value output frequency as a pixel count value in a last scanning line of a frame, and when obtaining the request signal, change a setting of the pixel count value for generating the vertical synchronizing signal, wherein the vertical synchronizing signal adjusting section counts a number of edges of a pixel clock having a pixel value output frequency as a pixel count value in a last scanning line of a frame, and changes a setting of the pixel count value for generating the vertical synchronizing signal.

7. A frame data output synchronizing method for an imaging device to synchronize a frame data output process in a display displaying a photographed moving image instantly with a frame data output process of the imaging device, the method comprising:

a step of outputting each piece of frame data in order of scanning lines at a frequency of a vertical synchronizing signal; and a step of changing a setting of timing of generation of the vertical synchronizing signal when a shift between an output time of the output frame data and a reference output time based on an output frequency in the display has exceeded a predetermined threshold value, wherein the timing of the generation of the vertical synchronizing signal is adjusted by counting a number of edges of a pixel clock having a pixel value output frequency as a pixel count value in a last scanning line of a frame, and changing a setting of the pixel count value for generating the vertical synchronizing signal.

8. A non-transitory, computer readable recording medium on which a computer program is recorded, the computer program making a computer realize:

a function of obtaining an input time of each piece of frame data sequentially input from a connected imaging device, and monitoring a shift between the input time of the frame data and a reference input time based on an output frequency in a display to which the frame data is output; and a function of transmitting a request signal to adjust timing of generation of a vertical synchronizing signal in the imaging device to the imaging device when the shift has exceeded a predetermined threshold value, wherein the timing of the generation of the vertical synchronizing signal is adjusted by counting a number of edges of a pixel clock having a pixel value output frequency as a pixel count value in a last scanning line of a frame, and changing a setting of the pixel count value for generating the vertical synchronizing signal.

* * * * *